United States Patent [19]

Pech

[11] Patent Number: 4,489,107
[45] Date of Patent: Dec. 18, 1984

[54] PROCESS AND APPARATUS FOR PRODUCING AN OPTICAL COMPONENT, PARTICULARLY A METAL REFLECTOR

[75] Inventor: Helmut Pech, Rebstein, Switzerland

[73] Assignee: Wild Heerbrugg Aktiengesellschaft, Switzerland

[21] Appl. No.: 455,759

[22] Filed: Jan. 5, 1983

[30] Foreign Application Priority Data

Jan. 13, 1982 [CH] Switzerland .......................... 183/82

[51] Int. Cl.³ .............................................. B05D 5/06
[52] U.S. Cl. ................................... 427/162; 427/166; 427/168; 118/323
[58] Field of Search ....................... 427/162, 166, 168; 118/323

[56] References Cited

U.S. PATENT DOCUMENTS 4,140,567 2/1979 Beecher .......................... 427/162 X Primary Examiner—Michael R. Lusignan
Attorney, Agent, or Firm—Roylance, Abrams, Berdo & Goodman

[57] ABSTRACT

Process for producing an optical component, particularly a metal reflector. A glass prism is sprayed with several coatings of a metal alloy. The spray jet is guided in such a way that uniform coating thicknesses are obtained. The resulting sprayed part is removed from the glass prism and the surface formed against the prism is used as a metal reflector. Additional coatings can also be applied after removal to improve reflectance characteristics.

8 Claims, 7 Drawing Figures

PROCESS AND APPARATUS FOR PRODUCING AN OPTICAL COMPONENT, PARTICULARLY A METAL REFLECTOR The invention relates to a process for producing an optical component, particularly a metal reflector, and to an apparatus for performing this process.

BACKGROUND OF THE INVENTION

Reflectors are generally used for electrooptical range finding or distance measurements. It has been found that reflectors can be inexpensively made from plastics, but such reflectors have the disadvantages that they deform and are therefore inaccurate. Therefore, such reflectors can only be used for very short ranges in electrooptical range finding.

Attempts have been made to produce reflectors from glass, which have a much better accuracy and can therefore be used for larger ranges in electrooptical range finding. However, such reflectors are expensive to manufacture.

Reflectors are also made from metal-plastics materials. These reflectors, known as hybrids, are produced by molding. Although they are more accurate than reflectors made from plastics alone, they are more expensive to manufacture than the latter.

The enumeration of known reflectors made from different materials show that accurate and precise reflectors can only be manufactured at great expense. It has therefore hitherto been necessary to accept certain disadvantages using expensive reflectors for longer ranges and cheaper reflectors for smaller ranges. There are no reflectors for medium ranges. The user is therefore forced to use very expensive reflectors for such medium ranges.

It is also pointed out that electrooptical range finding is used for the permanent monitoring of dams and glaciers, including avalanche-threatened areas. The need consequently exists for electrooptical range finding equipment which can be permanently installed at its point of use. However, this has not hitherto been possible because such equipment, particularly the reflectors, are much too complicated and therefore too expensive.

BRIEF SUMMARY OF THE INVENTION

An object of the invention is to permit the manufacture of a metal reflector combining the two previously mutually exclusive conditions of precision and simple, and therefore inexpensive, manufacture.

Briefly described, in one aspect the invention includes a method for producing an optical component such as a metal reflector including the steps of providing a glass prism supported on a rotatable mounting in an inert atmosphere, providing a spray nozzle capable of dispensing a spray of a molten alloy having a low melting point along an axis and supporting the spray nozzle such that the axis of the spray therefrom is perpendicular to exposed surfaces of the prism and so that the nozzle is linearly movable perpendicular to the spray axis. The method further includes spraying onto the surfaces of the prism a plurality of coatings of the metal alloy while maintaining the temperature of the atmosphere below the solidification temperature of the alloy and while concurrently rotating the prism and reciprocating the nozzle during the spraying, without using a separating agent, the direction reversal points of the reciprocation being selected such that the spray is beyond the prism surfaces, and removing the solidified coatings as a body having reflective surfaces.

In another aspect, the invention comprises an apparatus for producing an optical component such as a metal reflector comprising the combination of a glass prism having a plurality of surfaces, a support plate for supporting said prism with said surfaces exposed, said support plate having a support surface significantly larger than the adjacent surface of the prism, means for supporting and rotating the plate about a fixed axis at a substantially constant speed, nozzle means for ejecting a spray of a metal alloy having a low melting point, means for supporting the nozzle means so that the metal alloy spray therefrom is ejected perpendicular to a plane into which said exposed prism surfaces pass as the prism is rotated and for linearly reciprocating said nozzle means along a path parallel with said plane, said means for supporting including means for adjusting the angle of the nozzle means; and housing means for enclosing at least the prism, the support plate and the nozzle means in an inert atmosphere.

The advantage of the solution according to the invention is based on the simple and therefore inexpensive manufacturing process and provides the possibility of using reflectors manufactured in this way for medium ranges.

BRIEF DESCRIPTION OF THE DRAWINGS

An embodiment of the invention is described in non-limitative manner hereinafter with reference to the drawings, wherein:

FIG. 2b is a partial view, in section, of a portion of the reflector of FIG. 2a;

DETAILED DESCRIPTION OF THE PREFERRED EMBODIMENTS

Figure 1:
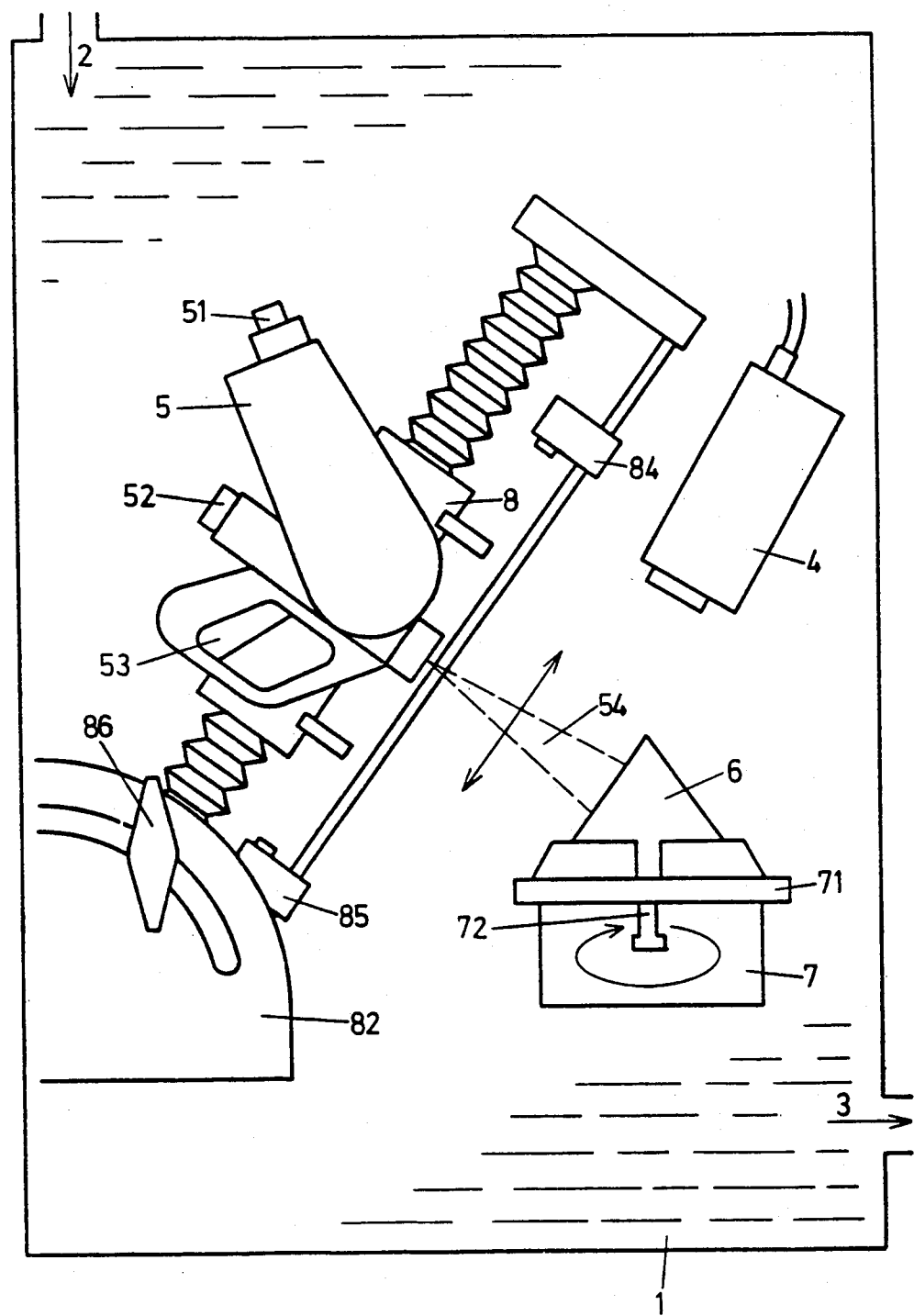
FIG. 1 is a schematic side elevation of an apparatus for performing the process according to the invention.

FIG. 1 shows a chamber 1 with a supply 2 for an inert gas, which can flow through the chamber and pass out again through an outlet 3. Chamber 1 contains infrared heaters, which are not specifically shown. These heaters raise the temperature in chamber 1 to a range which is below the melting point of the metal alloy, which will be discussed hereinafter. In general, this temperature range is between 70° and 150° C. and is kept constant. An infrared sensor 4 produces electrical signals representative of temperature to a control device (not shown), which correspondingly controls the heating devices in a well-known manner.

Figure 6:
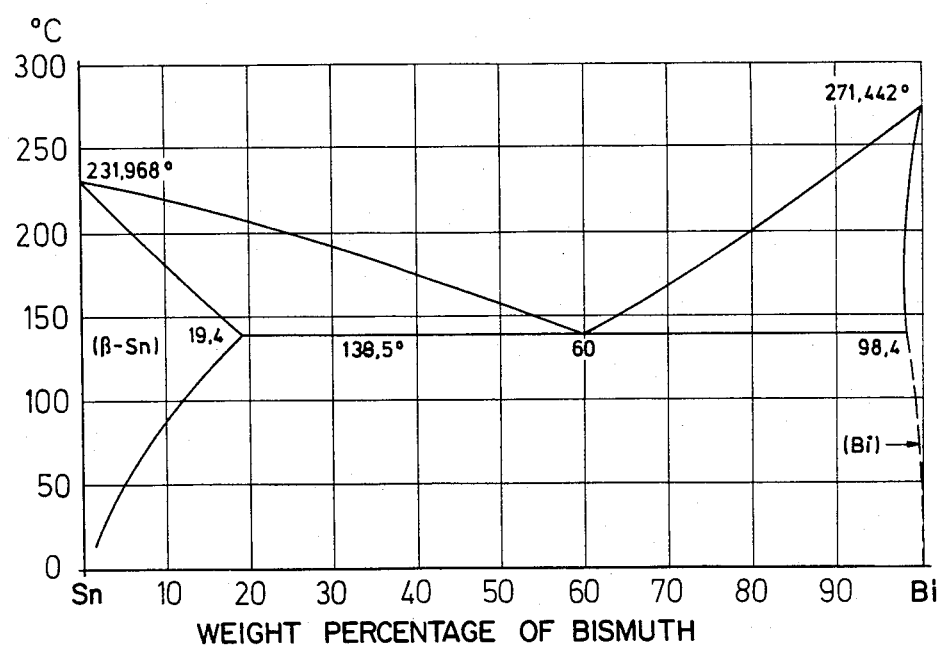
FIG. 6 is a phase diagram for a preferred system of metal alloys for producing the metal reflector.

A spraying mechanism 5, constructed as a spray gun, receives the material necessary to form the desired metal alloy through connection 51. Spray gun 5 contains a heating device which brings the metal alloy to the desired temperature and keeps it constant. The metal alloy in the present example is tin-bismuth with an addition of a small amount of cadmium and has a melting temperature of 150° C. In spray gun 5, the temperature must be held in the range of the aforementioned melting temperature. Phase diagram of FIG. 6 shows various possible combinations of pure bismuth-tin alloys with the melting temperatures as a function of the weight ratio of the individual component. FIG. 6 will be discussed hereinafter.

Spray gun 5 has an inlet 52 for a propellant gas, which can be an inert gas of group O of the periodic system, such as argon. The propelent gas can also be any one or ;a mixture of several such inert gases. Alternatively, the propellant gas can be nitrogen or carbon dioxide ($CO_2$). The gas is applied according to a preferred embodiment with about 57 psi (4 atü). The operator sprays the liquid metal alloy onto a glass prism 6, which is fixedly mounted on a rotary device 7, by operating the release button 53 which produces a conical spray 54. It is pointed out here that the glass prism can be made e.g. from crown glass containing boron. The spatial dimensions of the prism are approximately 20 mm in height and 20 mm in width. It is obviously also possible to use other types of glass for producing prism 6. The glass prism 6 is secured on plate 71 of rotatable device 7. Such a fixing device can, for example, be a screw 72, which is inserted from below and bonded to the base of the glass prism. This fixing device is only schematically shown in FIG. 1, because it is generally known. Rotatable device 7 is rotated by a conventional type of drive, not shown. In the present embodiment, device 7 is driven at 11 revolutions per minute but, as a function of the circumstances, can be between 5 and 35 r.p.m.

Spraying mechanism 5 is mounted on a linearly movable device 8, having at each of the top and bottom ends thereof a limit switch 84, 85, which upwardly and downwardly limits the lift movements. Spray gun 5 and device 8 are fixed to a clamping device 82, 86, which permits adjustment of the spray axis angle. It is important that the spray jet 54 strikes the surface of glass prism 6 at a right angle. This means that the angle between the surface of glass prism 6 and the vertical rotation axis of fixing plate 7 must be the same as the angle between the central axis of spray jet 54 and the horizontal plane. The thus adjusted spray gun is then relatively movable in a direction parallel to the surfaces of glass prism 6. The two reversal points at the top and bottom of this vertical movement are defined by the two limit switches 84, 85. The rotary device 7 is moved in a circular manner corresponding to the arrow. Glass prism 6 moves at a speed of 11 r.p.m. The operator now operates the release button 53 of the spray gun, starting the movement of movement device 8. The spray gun is reciprocated at a constant speed between the upper and lower limit switches. The two limit switches 84, 85 are adjusted in such a way that the spray gun can only reverse its movement direction when the spray jet 54 of metal alloy has passed beyond and therefore does not strike the surfaces of glass prism 6. The metal alloy is applied to glass prism 6 in a number of coatings. Application takes place to the base of fixing plate 71 of rotary device 7. In the present embodiment, approximately 4 to 6 mm of metal alloy are sprayed onto glass prism 6 and fixing surface 71, after which the spraying process is ended. The sprayed part 9, FIGS. 2a, 2b, which has been formed on and covered glass prism 6 and fixing plate 71 is now removed from both of them.

Figure 2A:
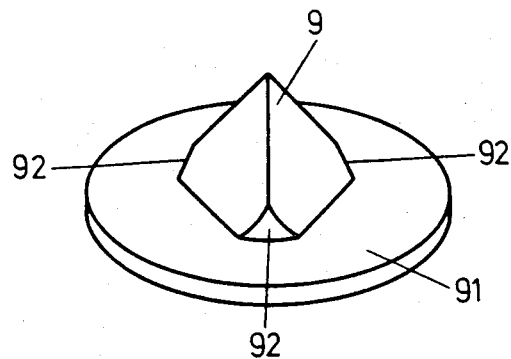
FIG. 2a is a perspective view of a metal reflector.

It now has the form shown in FIG. 2a. The reflecting surfaces of sprayed part 9 are interior surfaces which point downwardly and are not therefore visible in FIG. 2a. The sprayed part 9 also comprises surface 91. The angles of prism 6 are shaped in such a way that the corresponding angles 92 of sprayed part 9 have the shape shown in FIG. 2a. This has proved advantageous on removing the sprayed part 9 from glass prism 6. If the metal reflector 9 is now to be used, surface 91 is removed beforehand.

Figure 2B:
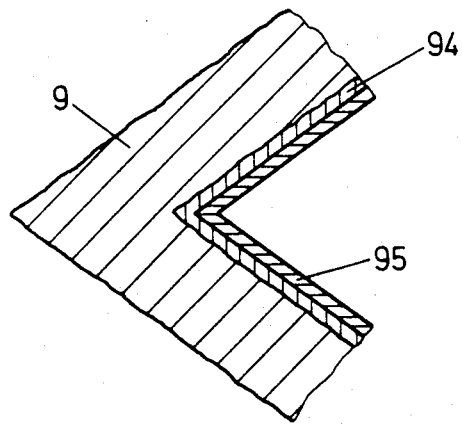

The reflection surface of the sprayed part or metal reflector 9 can also be further processed, as is shown e.g. in FIG. 2b.

FIG. 2b is a section through metal reflector 9, which on the reflecting surface has a vapor deposited coating 94 e.g. of chromium or nickel. This is a very effective diffusion barrier with respect to the next coating 95, which is also vapor-deposited on and comprises doped gold. These coatings can also be applied galvanically and/or chemically. The gold coating has the advantage of extremely good reflection, but the disadvantage that it is dissolved by material 9. Therefore, the diffusion barrier 94 is absolutely necessary. The thicknesses of coatings 94 and 95 each range between 100 and 500 nm.

Figure 3:
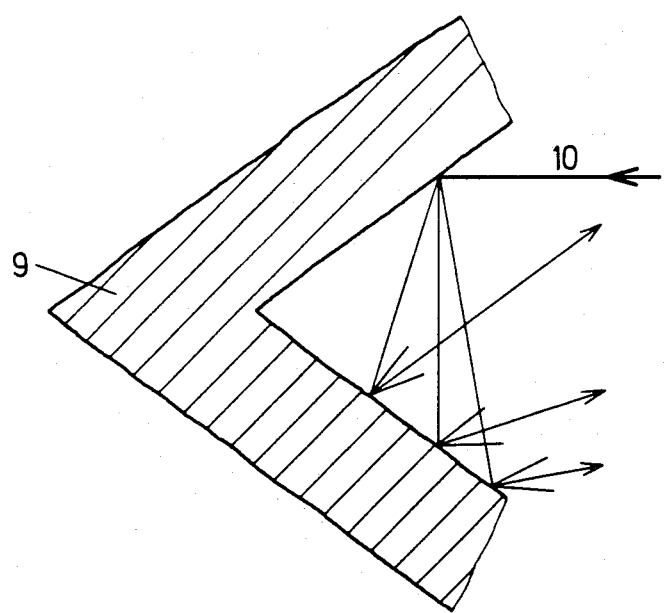
FIG. 3 is a partial sectional view showing the optical function of the metal reflector.

FIG. 3 shows the operation of such a metal reflector in electrooptical range finding. The beam 10 from the range finder transmitter is scattered on the first surface. As a result, the angle of the beams returning to the range finder receiver is increased,, so that range finding can be performed much more easily under any weather conditions. Such a scattering of the beams returning to the receiver can also only be achieved in the case of the metal reflector produced according to the process of FIG. 1.

Figure 4:
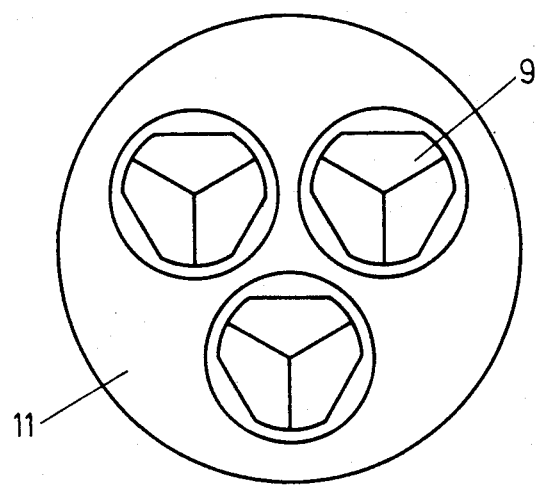
FIGS. 4 and 5 are plan views showing arrangements of the individual prisms produced according to the process of the invention to form piston or V-blocks.

FIG. 4 shows a metal reflector 11, in which three individual prisms or reflectors 9 are incorporated, serving to increase the range.

Figure 5:
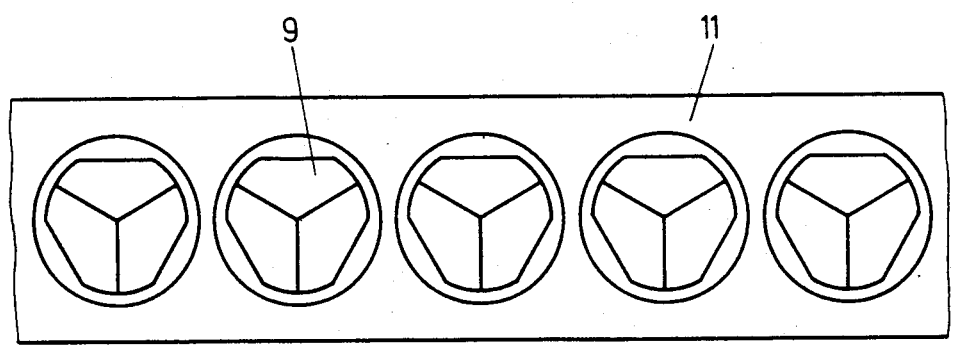

FIG. 5 shows five individual metal reflectors 9 formed into a so-called reflector belt. This is done for the same reason as described in connection with FIG. 4.

FIG. 6 shows the phase diagram of pure bismuth-tin alloy. In practice, however, no absolutely pure alloys, but only rather pure alloys are used. Low amounts (less than 1 percent) of cadmium have been observed in commercially available alloys. Such impurities are the reason for slight variations from diagram FIG. 6. The abscissa of the shown diagram indicates the weight percentages of the two components, the left end being 100% tin and the right extreme being 100% bismuth. On the ordinate is the melting temperature of the metal alloy. For this diagram reference is made to METALS HANDBOOK, 8th edition, page 273.

Apart from the components shown in FIG. 6, it is obviously possible to use other components for the metal alloys.

While certain advantageous embodiments have been chosen to illustrate the invention, it will be understood by those skilled in the art that various changes and modifications can be made without departing from the scope of the appended claims.

What is claimed is:

1. A method for producing an optical component such as a metal reflector comprising the steps of
providing a glass prism supported on a rotatable mounting in an inert atmosphere;
providing a spray nozzle capable of dispensing a spray of a molten alloy having a low melting point along an axis;
supporting the spray nozzle such that the axis of the spray therefrom is perpendicular to exposed surfaces of the prism and so that the nozzle is linearly movable perpendicular to the spray axis;
spraying onto the surfaces of the prism a plurality of coatings of the metal alloy while maintaining the temperature of the atmosphere below the solidification temperature of the alloy;

concurrently rotating the prism and linearly reciprocating the nozzle during the spraying, the reversal points of the reciprocation being selected such that the spray is beyond the prism surfaces; and removing the solidified coatings as a body having reflective surfaces.

2. A method according to claim 1 wherein the rotatable mounting includes a rotatable mounting plate, and wherein the metal alloy is sprayed onto the mounting plate as well as the prism.

3. A method according to claim 2 wherein, after solidification of the metal alloy, the prism is removed from the mounting plate along with the sprayed-on material covering the mounting plate.

4. A method according to claim 1 wherein the spray nozzle employs a propellant gas comprising at least one gas selected from group O of the periodic table.

5. A method according to claim 1 and further including, after removing the coatings, a coating of the inner surfaces in form of a vapor deposited layer of a diffusion barrier material followed by a layer of high reflectance material.

6. A method according to claim 5 wherein the barrier material is chromium or nickel.

7. A method according to claim 6 wherein the high reflectance material is vapor-deposited gold.

8. A method according to claim 1 and further including, after removing the coatings of the metal alloy, vapor depositing a thin layer of gold onto the surfaces of the coatings.

* * * * *